Aug. 5, 1958 I. BROWN 2,846,522

DIFFERENTIAL AMPLIFIER CIRCUITS

Filed Feb. 18, 1953

INVENTOR.
IRVING BROWN
BY
Busser, Smith & Harding
ATTORNEYS

United States Patent Office 2,846,522
Patented Aug. 5, 1958

2,846,522

DIFFERENTIAL AMPLIFIER CIRCUITS

Irving Brown, Glenolden, Pa., assignor to Sun Oil Company, Philadelphia, Pa., a corporation of New Jersey Application February 18, 1953, Serial No. 337,536

7 Claims. (Cl. 179—171)

This invention relates to differential amplifier circuits and has particular reference to the elimination of D. C. drift in circuits involving differential amplifiers.

In a conventional differential amplifier comprising a pair of tubes having a common cathode resistor and two or sometimes one anode resistor, permanent input connections are provided to the control grids of the tubes. In such an arrangement relative D. C. drift of the tube characteristics will appear as an amplified error in the output voltage taken from one or both of the anodes.

The effect of D. C. drift is even more pronounced when the output of the differential amplifier is subjected to further amplification in a direct current amplifier.

It is the general object of the present invention to provide circuit arrangements which will eliminate the effect of D. C. drift either in a simple differential amplifier or in the combination of such a differential amplifier with a D. C. amplifier involving feedback as is commonly the case in servo circuits or integrators or the like.

This object of the invention as well as subsidiary objects particularly relating to details of construction, operation and application will become apparent from the following description read in conjunction with the accompanying drawing, in which.

Figure 1:
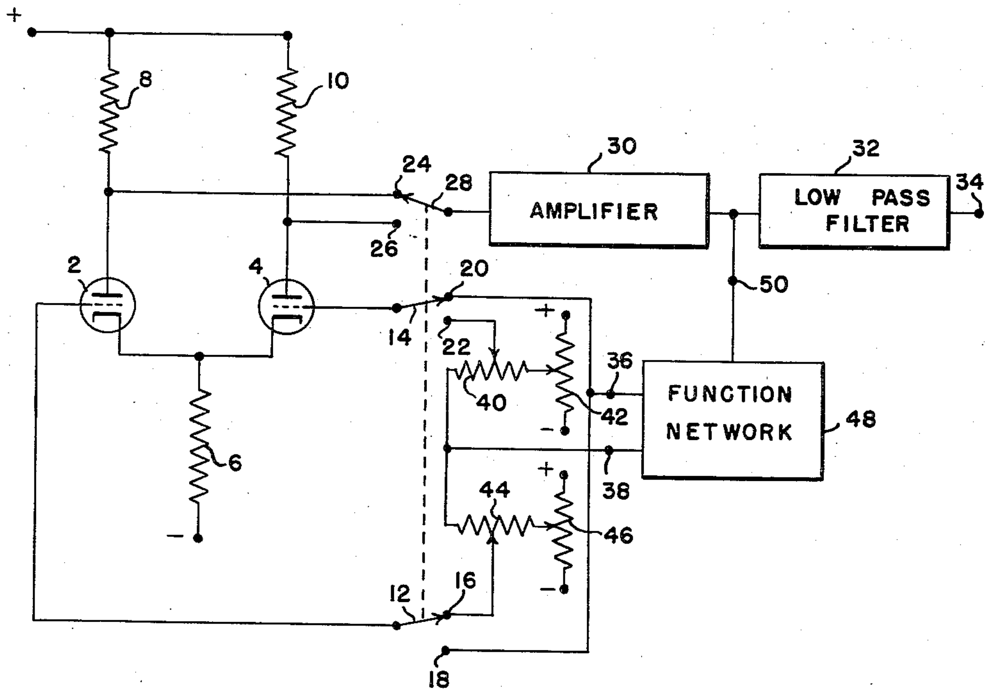
Figure 1 is a wiring diagram illustrating a circuit embodying the invention.

Referring first to Figure 1, there are shown at 2 and 4 a pair of triodes associated in conventional differential amplifier arrangement and having a common cathode load impedance 6 returned to a source of negative potential and a pair of anode load impedances 8 and 10 connected to a source of positive potential. While either of these sources may be grounded, it is customary in the use of differential amplifiers to have positive and negative supply potentials, the differential amplifier operating about a ground potential. As is usual, to minimize drift the triodes 2 and 4 may be incorporated in a single envelope, it being understood that such an arrangement is contemplated where two tubes are referred to herein.

It will be recognized that the differential amplifier to the extent so far described is conventional, the inputs being applied to the grids of the triodes and the output, depending upon the sense desired, being taken from either of the anodes if single ended operation, including possible amplification, is desired, or from both if the differential amplifier is followed by further differential amplification or if double ended operation, including possible amplification, is required. Under conditions of D. C. operation the output or outputs will drift with time changes of the tube characteristics.

In accordance with the present invention, the grid of triode 2 is connected to a switch 12 and the grid of triode 4 is connected to a switch 14. These switches are ganged and make alternate connections with the pairs of contact points 16 and 18 and 20 and 22, respectively. The anode of triode 2 is connected to a contact point 24 and the anode of triode 4 is connected to a contact point 26. A switch 28 is arranged to engage alternatively these two contact points and is ganged with the switches 12 and 14. The ganged switches may be simultaneously vibrated between their respective terminals by any suitable means, electromagnetic or mechanical, as, for example, by being in the form of switch elements of a single relay which is energized by alternating current. The switching may also be effected by electronic switching if high speed of switching is desired.

Switch 28 is connected to the input of an amplifier 30 which may be a D. C. amplifier for certain applications of the differential amplifier. The output from amplifier 30 is delivered through a low pass filter 32 the output of which is connected to an output terminal 34.

The contact points 18 and 20 are connected together and to a terminal 36. The contact points 16 and 22 are likewise connected together and to a terminal 38, but as illustrated in these connections there are interposed potentiometers 40, 42, 44 and 46 which, under some circumstances, are desirable for zero and slope characteristic corrections. The potentiometers 42 and 46 are connected between positive and negative supply terminals, and the adjustments of their contacts provide for zero corrections. The adjustments of the contacts of potentiometers 40 and 44 provide slope corrections. In some cases these corrective arrangements are unnecessary and then the contact points 16 and 22 would be directly connected together and to the common terminal 38.

For generality of disclosure there is indicated at 48 which is designated a function network connected to a terminal 50 which is connected to the output of the amplifier, and also connected to the terminals 36 and 38. The function network 48 is of possible quite general nature, and provides a feedback from the output of the amplifier 30 to the input or inputs to the triodes 2 and 4.

Such a network is used in various servo systems and for the production of various calculating elements or the like. It may consist of a passive network of resistances, capacitances and inductances, or it may more elaborately include mechanical elements, photoelectric devices, or the like, and may have electrical, mechanical, light, or other input depending upon its nature. Particular examples of the nature of such network will be hereafter described.

The amplifier 30 in some cases may be omitted, a direct connection being involved between switch 28 and terminal 50. In certain other cases, as in integrators, the low pass filter 32 is unnecessary. The circuit given in Figure 1, however, has broad generality and it will be understood that it may be simplified depending upon the results desired.

Considering first a simple circuit involving independent inputs to the terminals 36 and 38, with omission of the function network 48, and with possible omission of the amplifier 30, the nature of the drift elimination may be described. If the ganged switches 12, 14 and 28 are vibrated between their respective contacts at a rate suitable for the desired results, and if it is assumed that the circuit was initially balanced but has been subject to drift of the characteristics of the triodes, it will be evident that with constant potential inputs or with varying potential inputs at terminals 36 and 38, the variations being relatively slow with respect to the frequency of vibration of the switches, there will be produced at the switch 28 an output which will have a rectangular waveform but an average value depending upon the inputs at 36 and 38. In other words, this square wave having the frequency of the switch vibrations will have its excursions above and below the theoretical output which would occur if no drift had occurred, the amplitude of the excursions corresponding to the amount of drift measured in terms of change of output potential due thereto. This amplitude will, in general, be low, and the square wave ripples will be filtered out by the low pass filter 32 so as to provide at terminal 34 an output corresponding to condition of no drift.

Assuming now that an amplifier 30 is present which also involves drift, its drift will not be subject to the correction and elimination as indicated above. However, in many cases the differential amplifier involves feedback from the output of the amplifier either of simple and direct nature or through some function network such as 48 to provide a feedback to one or both of the terminals 36 and 38 depending upon the results required. Such an arrangement, for example, is present in a servo system, in which the function network may be either simple or elaborate in accordance with what has been already discussed. Assuming, therefore, that there is a function network present, it will be evident that by reason of the vibration of the switches between their contact points, there will again be produced at 28 a rectangular type of wave having as its average value the theoretical value corresponding to conditions of no drift in the differential amplifier. In the case of such a feedback, however, the drift in the amplifier is also corrected, being divided down by the gain of the differential amplifier to an effect of only minor order. Furthermore, the amount of filtering required is small since the square wave amplitude is restricted to twice the magnitude of the drift effect.

Figure 2:
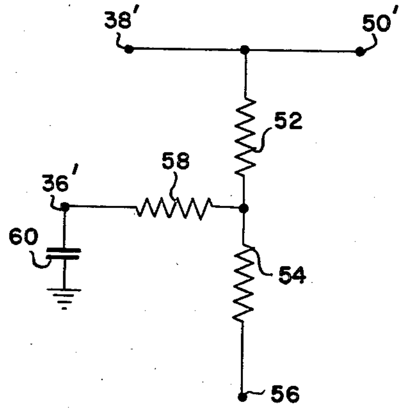
Figure 2 is a circuit diagram of an element associated with a differential amplifier for the production of a so-called boot strap integrator.
Figure 3:
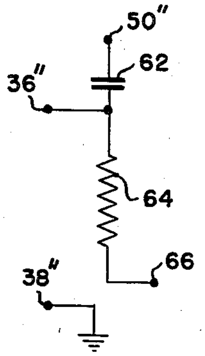
Figure 3 is a diagram similar to Figure 2 but showing an element to form part of a Miller integrator.

In order to illustrate the type of function networks which may be involved, there are indicated in Figures 2 and 3, respectively, networks which may be actually involved at 48 to provide, respectively, boot strap and Miller integrators.

Referring first to Figure 2, there are indicated at 36', 38' and 50' terminals which correspond to and are connected into the circuit the same as the respective terminals 36, 38 and 50 of Figure 1. The terminals 38' and 50' are connected to each other end through resistors 52, and 54, in series, to an input terminal 56 to which is introduced the function to be integrated. The junction of resistors 52 and 54 is connected through resistor 58 to the terminal 36' which is connected through condenser 60 to ground.

When the network illustrated in Figure 2 is used at 48, the result is the provision of a boot strap integrator. The output at terminal 50' corresponds to the integral of the potential input at terminal 56. Since integration is involved there is no necessity for the provision of a low pass filter such as 32 and this may be omitted, even though in the operation there is, of course, involved the flow of a pulsating square wave current when drift exists in the differential amplifier or in the amplifier 30. The excursions of this square wave cancel each other out and do not affect the accuracy of the integration.

In similar fashion there may be used the network of Figure 3 to provide a Miller integrator. In this case the terminals 36'', 38'' and 50'' are connected at the positions of terminals 36, 38 and 50. A condenser 62 and resistor

64 are connected in series between terminal 50'' and an input terminal 66. The junction between condenser 62 and resistor 64 is connected to terminal 36''. Terminal 38'' is grounded. The integral of the function input at 66 appears at the output terminal 50''. As in the case of the boot strap integrator, it is unnecessary to provide a low pass filter since the integration cancels out the effects of the square wave.

What is claimed is:

1. Apparatus comprising a differential amplifier circuit including a pair of thermionic tube assemblies having respective control grids and a pair of individual output terminals, and switching means including a pair of individual terminals for connecting input to said differential amplifier grids, a single output terminal for receiving output from said differential amplifier and means for alternately first simultaneously connecting a first of said input terminals to a first of said grids, the second of said input terminals to the second of said grids and a first of said individual output terminals to said single output terminal, and secondly simultaneously connecting said first of said input terminals to said second of said grids, said second of said input terminals to said first of said grids and the second individual output terminal to said single output terminal.

2. Apparatus in accordance with claim 1 including an amplifier receiving an input from said single output terminal and means providing feedback from said amplifier to said input terminals.

3. Apparatus in accordance with claim 1 including means providing feedback from said single output terminal to said input terminals.

4. Apparatus in accordance with claim 1 including a function network connected between said single output terminal and said input terminals.

5. Apparatus in accordance with claim 1 including an amplifier receiving an input from said single output terminal and a function network connected between said amplifier and said input terminals.

6. Apparatus in accordance with claim 1 including an integrating network connected between said single output terminal and said input terminals.

7. Apparatus in accordance with claim 1 including an amplifier receiving an input from said single output terminal and an integrating network connected between said amplifier and said input terminals.

References Cited in the file of this patent

UNITED STATES PATENTS

| | | |
|---|---|---|
| 2,323,966 | Artzt | July 13, 1943 |
| 2,475,188 | Krauth | July 5, 1949 |
| 2,494,317 | Seybold | Jan. 10, 1950 |
| 2,497,129 | Liston | Feb. 14, 1950 |
| 2,510,714 | Patremio | June 6, 1950 |
| 2,647,214 | Penney et al. | July 28, 1953 |
| 2,676,272 | Byrd | Apr. 20, 1954 |
| 2,676,300 | Hirsch et al. | Apr. 20, 1954 |

FOREIGN PATENTS

| | | |
|---|---|---|
| 620,140 | Great Britain | Mar. 21, 1949 |
| 684,862 | Great Britain | Dec. 24, 1952 |